April 22, 1969  H. W. ANDERSEN  3,440,144
METHOD AND APPARATUS FOR CHECKING AND TESTING
THE EFFECTIVENESS OF STERILIZATION
Filed May 21, 1965
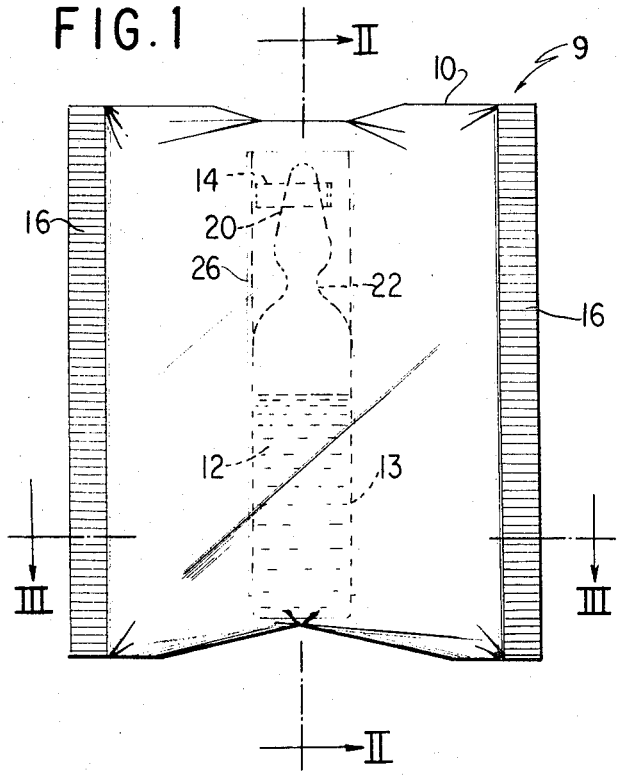
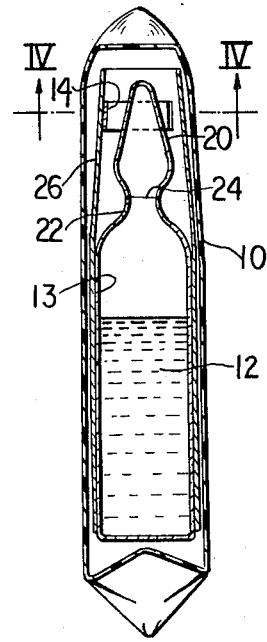
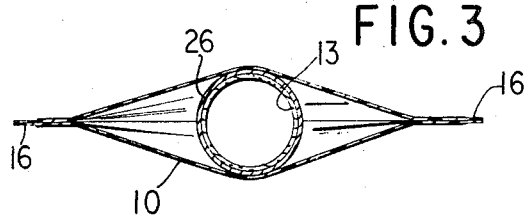
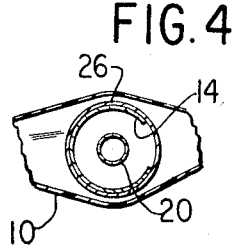
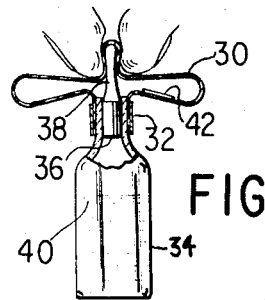
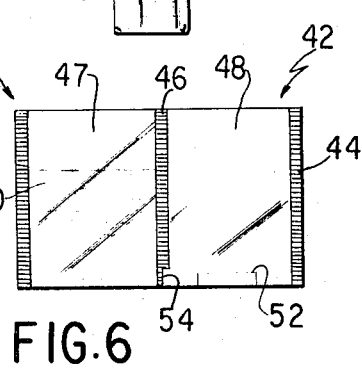
INVENTOR
Harold W. Andersen
BY
Brown & Seward
ATTORNEYS

United States Patent Office 3,440,144
Patented Apr. 22, 1969

3,440,144
METHOD AND APPARATUS FOR CHECKING AND TESTING THE EFFECTIVENESS OF STERILIZATION
Harold W. Andersen, Oyster Bay, N.Y., assignor to H. W. Andersen Products, Inc., Oyster Bay, N.Y., a corporation of New York
Filed May 21, 1965, Ser. No. 457,625
Int. Cl. C12k 1/06
U.S. Cl. 195—103.5          12 Claims

ABSTRACT OF THE DISCLOSURE

A method and apparatus for testing the effectiveness of sterilization which comprises placing a source of live micro-organisms within an enclosure associated with a sterile source of culture medium confined out of contact with the micro-organisms during sterilization but adapted to be brought into contact therewith after the micro-organisms and culture medium have been exposed to a sterilization procedure, the micro-organisms being contained at all times within the enclosure and neither the culture medium nor the micro-organisms being exposed to contamination either during the sterilization procedure or during the subsequent test period.

---

This invention relates to a method and apparatus for checking and testing the effectiveness of sterilization.

Heretofore, in one known method of sterilization testing, source of live bacteria, spores, or micro-organisms such as contained on a piece of absorbent paper, was placed in a sterilization chamber along with the objects to be sterilized. Upon completion of sterilization, the absorbent paper was removed and placed in a culture medium and the latter transferred to a warming oven to develop the bacteria or the like in the culture. The culture was then examined and tested to determine if any of the bacteria survived the sterilization and grew in the culture. This method required a high degree of skill and care in an attempt to prevent contamination of the culture medium and the test objects when the absorbent paper was transferred from the sterilization chamber to the culture medium. This prior known method, therefore, in addition to being time consuming, was subject to inaccuracies due to contamination.

It is an object of the present invention to avoid and overcome the foregoing and other difficulties of prior art practices by the use of a method and apparatus which eliminates the possibility of contamination and attendant inaccuracies in test results.

Another object is to provide a method and apparatus for determining the presence or absence of live bacteria, or the like, following sterilization in a sterilization apparatus in an efficient manner which is both time saving and accurate and which eliminates the requirement for a high degree of skill and care heretofore required in known prior art practices.

Another object is to provide a method and apparatus which may be used to test the efficiency of heat or gas sterilization.

The aforesaid objects and other objects which will become apparent as the description proceeds are achieved by placing a source of live bacteria or the like (denominated generally as "micro-organisms") within an enclosure which is placed in a sterilizing chamber. After sterilization is completed, a culture medium is brought into contact with the source of bacteria in such a manner that neither the source of bacteria nor the culture medium is exposed to contamination during the test period. In one embodiment of the invention, the culture medium is contained within a sealed ampule which is packaged in a closed flexible transparent bag along with a source of bacterial spores such as contained on a piece of filter paper. The package is placed in a sterilization chamber along with the objects to be sterilized. After sterilization, the culture medium is released into the flexible bag to contact or immerse the filter paper. This release is accomplished by grasping the ampule through the flexible bag to break the seal of the ampule without impairing the closure of the flexible bag. The unit is then placed in a warming oven and upon removal, viewing of the contents through the transparent bag will indicate if proper sterilization has been accomplished. The closed flexible bag isolates the source of bacterial spores and the culture medium during this test period to thereby prevent contamination from an external source. This embodiment may be used to check and test either heat sterilization (e.g. steam) or gaseous sterilization (e.g. ethylene oxide). In the case of the latter, the flexible bag is made at least partially of a semi-permeable material which allows the transmission of the gaseous sterilant therethrough but not of bacteria or the like. Thus, the source of bacteria in the bag is exposed to the gaseous sterilant but remains isolated from external contamination.

For a better understanding of the present invention reference should be had to the accompanying drawings wherein like numerals of reference indicate similar parts throughout the several views and wherein:

FIG. 1 is an elevational view of one form of apparatus embodying the invention.

FIG. 2 is an enlarged sectional view taken along the line II—II of FIG. 1.

FIG. 3 is a sectional view taken along the line III—III of FIG. 1.

FIG. 4 is a partial sectional view taken along the line IV—IV of FIG. 2.

FIG. 5 is a sectional view of an alternate embodiment in which an enclosure is affixed to a container containing the culture medium.

FIG. 6 is an elevational view of a further alternate embodiment in which the culture medium and the source of bacterial spores are in compartments of an enclosure.

With specific reference to the form of the invention illustrated in the drawings, and referring particularly to FIG. 1, there is shown a package 9 comprising an enclosure in the form of a bag 10 in which are contained a source of culture medium 12 in a sealed contianer or ampule 13 and a source of bacterial spores or the like on a piece of absorbent paper 14. The enclosure or bag 10 may be made of a transparent and flexible sleeve suitably sealed at each end 16 such as by a heat seal.

The ampule 13 is provided with a spout 20 joined to the main body by a narrow neck 22. The spout 20 is initially open at its terminal end to provide access for the culture medium 12. Thereafter, the open end is suitably sealed as by applying heat to soften and close the end. The narrow neck 22 is provided with a score line 24 to facilitate breaking off of the spout 20 from the main body of the ampule 13 to release the culture medium into the interior of the bag 10 as will be described. The ampule 13 may be made of any suitable material, for example glass, which is impervious to the transmission of bacteria or the like.

After the spout 20 of the ampule 13 has been sealed as described, a protective flexible sleeve 26 may be placed on the ampule to extend over the spout 20. This flexible sleeve 26 prevents sharp edges or spikes of glass resulting from the breaking off of the spout of the ampule, as will be described, from puncturing or otherwise damaging the bag 10. This protective sleeve 26 is preferably made of a flexible transparent material and may be held in place on the ampule by any suitable means such as by an interference fit as illustrated. The absorbent paper 14 may be conveniently accommodated in the protective sleeve 26 and held therein by its natural resiliency as shown.

Initially sterilized culture medium 12 is poured into the ampule 13 and the spout of the latter suitably sealed as previously described. After sealing, the ampule and its contents are again sterilized. The protective sleeve 26 is then slipped onto the ampule 13 and the absorbent paper 14 containing bacterial spores or the like is placed in the protective sleeve 26. The sub-assembly is then placed within the bag 10 and the latter heat sealed along the ends 16 to isolate the aforesaid sub-assembly within the bag 10. The entire unit or package 9 may then be stored until it is ready for use in checking sterilization.

In operation, the closed package 9 is placed in a sterilization chamber along with the items to be sterilized. After completion of sterilization, the package 9 is removed and the spout 20 of the ampule 13 is broken off from the main body thereof to release the culture medium 12 into the bag 10 to contact or immerse the absorbent paper 14 in the culture medium. In order to insure that the absorbent paper 14 will contact the culture medium 12, the bag 10 is inverted from the position shown in FIG. 1 so that the culture medium will flow out of the ampule to attain a level in the bag 10 sufficient to provide the contact. It will be evident that it is a relatively simple operation to grasp the spout 20 with one hand by compressing the bag 10 and protective sleeve 26 adjacent thereto, to grasp the main body of the ampule 13 with the other hand, and to thereafter cant the spout 20 and thereby break it off. It will also be evident that this operation may be accomplished without puncturing the flexible bag 10.

Thereafter the package 9 is placed in a warming oven, e.g. a laboratory incubator, for a predetermined period of time, e.g. twenty-four to forty-eight hours, after which the contents in the bag 10 may be readily observed to determine if proper sterilization has been accomplished. The indication that satisfactory sterilization has been achieved in the sterilization chamber may vary depending on the types of test materials used. However, when using a culture material such as Fluid Thioglycollate, a growth of bacterial spores, signifying that proper sterilization has not been achieved in the sterilizing chamber, is indicated by a yellow coloring and a turbid condition of the culture medium 12. On the other hand, absence of a growth of bacterial spores, signifying that proper sterilization has been accomplished in the sterilizing chamber, is indicated by a salmon pink and clear culture medium.

The method and apparatus of this invention may be used for checking and testing the efficiency of heat sterilization (e.g. steam) or gaseous sterilization (e.g. ethylene oxide). In the former, the bag 10 is made of a heat resistant material, for example polypropylene, nylon, or a polyester film such as Mylar. The protective sleeve 26 is also made of heat resistant material of the types indicated. It will be readily evident that the bacterial spores on the absorbent paper will be heated to the sterilization temperature to serve as an indicator to determine the effectiveness of sterilization.

When used with gaseous sterilization such as ethylene oxide, the bag 10 is made of a semi-permeable material, for example polyethylene, which allows the gaseous sterilant to diffuse through the walls of the bag 10 to the absorbent paper 14 but which prevents the transmission of bacteria or the like therethrough. With this arrangement the absorbent paper 14 is exposed to the gaseous sterilant and thereby serves as an indicator to determine the effectiveness of sterilization.

It will be observed from the above that the bag 10 is closed and sealed throughout the testing operation. Thus the test materials and apparatus within the bag are not touched by personnel nor are they exposed to the surrounding atmosphere during the test. Accordingly, the contents of the bag 10 are isolated to preclude the possibility of contamination from an external source. The results of the sterilization are readily observable through the transparent bag 10.

The source of bacterial spores may be other than the illustrated absorbent paper, for example, the outside of the spout 20 of the ampule may have bacterial spores or the like applied thereto.

The bacteria, spores, or micro-organisms employed may be of the type well known in sterilization tests. These may be, for example, *Bacillus subtilis, Clostridium sporogenes,* or *Bacillus stearothermophilus.* Also *Bacillus sutlis* or *niger* variants may be used.

Merely by way of example, the following design characteristics have been found to provide satisfactory test results: an ampule 13 of ten cubic centimeters capacity containing approximately seven or eight cubic centimeters of culture medium in the form of Fluid Thioglycollate, an enclosure bag made from two mil polyethylene (for use in testing gaseous sterilization) or from three mil polypropylene or polyester film (for use in testing steam sterilization) and which measures four inches across the flats, a protective sleeve 26 of polyvinyl chloride (for gaseous sterilization) or polypropylene (for steam sterilization), and a strip of filter paper contaminated with bacterial spores.

It will be observed that in the case of checking gaseous sterilization, the function of the bag 10 is to diffuse a gaseous sterilant therethrough and to prevent the transmission of bacteria or the like. Accordingly, it will be readily evident that other types of structures utilizing a semi-permeable membrane may be used in place of the bag 10. For example, the enclosure may be constructed partially of a rigid structure having a semi-permeable membrane in the form of a panel therein.

As a further alternate embodiment, illustrated in FIG. 5, a transparent and flexible bag 30 may be sealed such as by the adhesive strip 32 to the neck of an ampule 34. The ampule is closed by an impervious stopper 36 which has an extension 38 extending into the bag 30 to facilitate withdrawal of the stopper to release culture medium 40 into the bag to contact a source of bacterial spores 42. The bag 30 may be readily flexed as shown to facilitate grasping of the stopper. After the stopper is removed, the ampule 34 is inverted and the culture medium 40 passes into the bag to fill out the latter and to contact the source of bacterial spores as the latter falls into the culture medium. It will be observed that with this construction the culture medium and the source of bacterial spores are isolated from contamination during testing.

In place of the ampule 13 in FIG. 1, the ampule 34 and stopper 36 of FIG. 5 may be used in the bag 10 of FIG. 1. Also the ampule and spout construction of FIG. 1 may be used with the bag 30 of FIG. 5.

As a further alternate embodiment, shown in FIG. 6, a sleeve 42 made of a transparent flexible material may be heat sealed at the ends 44 and along an intermediate section 46 to divide the sleeve into two compartments 47 and 48, the former 47 containing a culture medium 50 and the latter 48 a source of bacterial spores 52. Thus the two compartments are suitably isolated but communication may be readily established by squeezing the compartment 47 to cause the culture medium 50 to break the narrow and weaker heat sealed portion 54 and enter the compartment 48 to contact the source of bacterial spores 52.

From the above it will be seen that there has been described a method and apparatus which may be used for checking and testing either heat or gaseous sterilization, which isolates the critical test apparatus from the possibility of contamination and attendant inaccuracies in test results, and which does not require the high degree of skill and care heretofore required in known prior art practices.

It will be understood that various changes may be made in the form, construction and arrangement of the several parts and the steps of the method of use without departing from the spirit and scope of the invention, and hence I do not intend to be limited to the details shown or described herein except as the same are included in the claims or may be required by disclosures of the prior art.

What I claim is:

1. Apparatus for testing the sufficiency of sterilization comprising a closed container of liquid culture medium, a source of micro-organisms, an enclosure for said source of micro-organisms, said closed container being within said enclosure and said enclosure being made of a semipermeable material for diffusing a gaseous sterilant therethrough while preventing the diffusion of the micro-organisms, and means adapted to be manipulated externally of the enclosure to release said culture medium into contact with said source of micro-organisms while both are isolated by said enclosure from external contamination.

2. Apparatus as set forth in claim 1 wherein said source of micro-organisms comprises a strip of absorbent paper on which the micro-organisms are contained.

3. Apparatus as set forth in claim 1 wherein said source of micro-organisms is applied to the outside of said closed container.

4. Apparatus for testing the sufficiency of sterilization, comprising a container of liquid culture medium having a sealing member, a transparent and flexible enclosure about said sealing member, said sealing member being operable to provide and obstruct communication between said container and said enclosure while the integrity of the latter is maintained, a source of micro-organisms in said enclosure, said enclosure being made of a semipermeable material for diffusing a gaseous sterilant therethrough while preventing the diffusion of the micro-organisms, and manipulative means on said sealing member and within said enclosure operable to be manipulated externally of said enclosure to provide communication between said container and said enclosure whereby the culture medium is brought into contact with the source of micro-organisms within the enclosure.

5. Apparatus as set forth in claim 4 wherein said container is an ampule and said sealing member is a spout integral with said ampule and joined to the latter along a score line which is adapted to be fractured.

6. Apparatus as set forth in claim 4 further comprising a protective sleeve extending about said sealing member for aiding in protecting said flexible enclosure from said sealing member.

7. Apparatus as set forth in claim 4 wherein said sealing member is a stopper having an extension within said enclosure.

8. Sterilizing test apparatus comprising a container of liquid culture medium, a sealing member on said container, a transparent and flexible enclosure affixed to said container about said sealing member, a source of micro-organisms in said flexible enclosure, and means on said sealing member extending into said flexible enclosure adapted to be manipulated externally of said flexible enclosure to remove said sealing member from said container while maintaining the integrity of the flexible enclosure, whereby the culture medium is brought into contact with the source of micro-organisms within the flexible enclosure.

9. Sterilizing test apparatus comprising a transparent and flexible enclosure having separate compartments, a liquid culture medium in one compartment and a source of micro-organisms in another compartment, and means between said compartments adapted to react to external manual manipulation of the flexible enclosure for establishing communication between said compartments whereby the culture medium is brought into contact with the source of micro-organisms.

10. The method of testing the sufficiency of sterilization, comprising the steps of providing a sterile liquid culture medium and a source of micro-organisms, containing said source of micro-organisms within a flexible enclosure, confining said culture medium in a container having a seal operable to provide and obstruct communication between said container and said enclosure, transmitting the efficacious sterilizing qualities of a sterilant from a source external of said enclosure to within said enclosure while preventing transmission of micro-organisms therethrough, manipulating said seal externally of and through said flexible enclosure to open communication between said container and said enclosure, and passing said culture medium from said container to said enclosure to contact said source of micro-organisms while maintaining the integrity of the flexible enclosure.

11. The method of testing the sufficiency of sterilization comprising the steps of providing a sterile liquid culture medium and a source of micro-organisms, confining said culture medium in a container having a closure adaptable to seal and unseal said container, containing said source of micro-organisms and said closure within a flexible enclosure, transmitting the efficacious sterilizing qualities of a sterilant from a source external of said flexible enclosure to within the latter while preventing transmission of micro-organisms therethrough, releasing said closure after completion of sterilization by manipulation thereof through and externally of said flexible enclosure, and passing said culture medium from said container to said flexible enclosure to contact said source of micro-organisms while maintaining the integrity of the flexible enclosure.

12. The method of testing the sufficiency of sterilization, comprising the steps of providing a sterile liquid culture medium and a source of micro-organisms, containing said culture medium within a container, enclosing said container and said source of micro-organisms within a flexible enclosure made of a semi-permeable material adapted to prevent escape of said micro-organisms, diffusing a gaseous sterilant through said semi-permeable material into said enclosure, releasing said culture medium from said container, and passing said culture medium into contact with said source of micro-organisms while maintaining the integrity of the flexible enclosure.

References Cited

UNITED STATES PATENTS

| | | | |
|---|---|---|---|
| 3,346,464 | 10/1967 | Ernst | 195—103.5 |
| 2,854,384 | 9/1958 | Beakley et al. | 195—103.5 X |
| 2,950,202 | 8/1960 | Brockman | 195—54 X |
| 2,998,306 | 8/1961 | Huyck et al. | 195—103.5 |
| 3,068,154 | 12/1962 | Majors | 195—103.5 X |
| 3,239,429 | 3/1966 | Menolasino et al. | 195—103.5 X |

ALVIN E. TANENHOLTZ, *Primary Examiner.*

U.S. Cl. X.R.

195—54, 59, 127